(12) United States Patent
Matsubara et al.

(10) Patent No.: US 6,227,690 B1
(45) Date of Patent: May 8, 2001

(54) VEHICLE HEADLIGHT

(75) Inventors: Masao Matsubara; Hiroshi Shida, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/360,698

(22) Filed: Jul. 26, 1999

(30) Foreign Application Priority Data

Aug. 25, 1998 (JP) .................................................. 10-238682

(51) Int. Cl.[7] ...................................................... F21U 17/02
(52) U.S. Cl. .......................... 362/512; 362/520; 362/324; 362/284
(58) Field of Search .................................. 362/520, 512, 362/277, 282, 284, 319, 322, 324

(56) References Cited

U.S. PATENT DOCUMENTS

| | | | | |
|---|---|---|---|---|
| 1,731,125 | * | 10/1929 | Cassetty, Jr. et al. | 362/284 |
| 2,475,365 | * | 7/1949 | Walsh | 362/284 |
| 5,068,768 | * | 11/1991 | Kobayashi | 362/319 X |
| 5,138,540 | * | 8/1992 | Kobayashi et al. | 362/319 X |
| 5,584,568 | * | 12/1996 | Corbasson et al. | 362/319 X |
| 5,709,452 | * | 1/1998 | Bertling et al. | 362/512 X |

* cited by examiner

*Primary Examiner*—Laura K. Tso
(74) *Attorney, Agent, or Firm*—Fish & Richardson P.C.

(57) ABSTRACT

A vehicle headlight designed in such a manner that a tilting member is tiltably supported through an irradiation angle adjusting mechanism by a supporting member is described. A supporting shaft is provided on the upper part or lower part of the tilting member in such a manner that the supporting shaft protrudes horizontally and in a direction perpendicular to an irradiation axis. Bearing members are secured to the supporting member, and stationary fulcrum sections of the irradiation angle adjusting mechanism are formed by rotatably holding the supporting shaft on the bearing members. By operating a distance adjusting member arranged in a movable fulcrum section of the irradiation angle adjusting mechanism, the tilting member may be tilted with the supporting shaft as a tilting fulcrum.

9 Claims, 7 Drawing Sheets

VEHICLE HEADLIGHT

BACKGROUND OF THE INVENTION

1. Technical Field of the Invention

This invention relates to an improvement of a vehicle headlight.

2. Discussion of the Prior Art

In the case of vehicle headlights, and in the case of vehicle headlights including auxiliary headlights such as headlights and fog lamps, it is essential that their irradiation angles can be adjusted so that they suitably irradiate forwardly of the vehicles.

Accordingly, generally, a vehicle headlight is so designed that a lamp body or reflector, and a supporting member are coupled to each other with a movable fulcrum section and a stationary fulcrum section in such a manner that the lamp body or reflector is tiltable with respect to the supporting member. Thus, the vehicle headlight has an irradiation angle adjusting mechanism to adjust its irradiation angle.

There is available a vehicle headlight, such as a vehicle front headlight employed as an auxiliary headlight (hereinafter referred to as "an auxiliary headlight", when applicable) which is set in the lamp body of a headlight unit comprising a headlight and some other lamps. That is, the above-described auxiliary headlight is generally arranged in the lamp body of the headlight in such a manner that the reflector can be tilted with the irradiation angle adjusting mechanism.

On the other hand, the above-described auxiliary headlight is built inside the headlight. Therefore, the space around the auxiliary headlight is small; that is, the space for the irradiation angle adjusting mechanism made up of the movable fulcrum section and the stationary fulcrum section is limited.

In the stationary fulcrum section, the lamp body or reflector is generally coupled to a pivot buried in the supporting member with a so-called "bearing nut" which is mounted on the lamp body or reflector. Accordingly, the stationary fulcrum section is intricate in structure, and the assembling work is low in efficiency.

SUMMARY OF THE INVENTION

Accordingly, presented is an irradiation lamp which is simplified in structure, thus occupying a small space, thereby to provide a vehicle headlight which can be suitably arranged in a small space where a vehicle headlight having a conventional irradiation angle adjusting mechanism cannot be arranged. This is achieved by the provision of a vehicle headlight designed in such a manner that a tilting member is tiltably supported through an irradiation angle adjusting mechanism by a supporting member, in which, according to the invention, a supporting shaft is provided on the upper part or lower part of the tilting member in such a manner that the supporting shaft protrudes horizontally and in a direction perpendicular to an irradiation axis. Bearing members are secured to the supporting member, and stationary fulcrum sections of the irradiation angle adjusting mechanism are formed by rotatably holding the supporting shaft on the bearing members. By operating a distance adjusting member arranged in a movable fulcrum section of the irradiation angle adjusting mechanism, the tilting member is tilted with the supporting shaft as a tilting fulcrum.

The irradiation angle adjusting mechanism (especially in the stationary fulcrum sections) is such that the supporting shaft is merely held with the bearing members. That is, the irradiation angle adjusting mechanism is simple in structure, and its arranging space is small.

The nature, utility and principle of the invention will be more clearly understood from the following detailed description and the appended claims when read in conjunction with the accompanying drawings.

BRIEF DESCRIPTION OF THE DRAWING(S)

DETAILED DESCRIPTION OF THE INVENTION

A vehicle headlight, which constitutes a preferred embodiment of the invention, will be described with reference to the accompanying drawings. However, it should be understood that other implementations are contemplated.

In the embodiment, as described below, the vehicle headlight of the invention is applied to an auxiliary headlight 1 such as a fog lamp which is arranged in the housing of the headlight of a vehicle.

Figure 1:
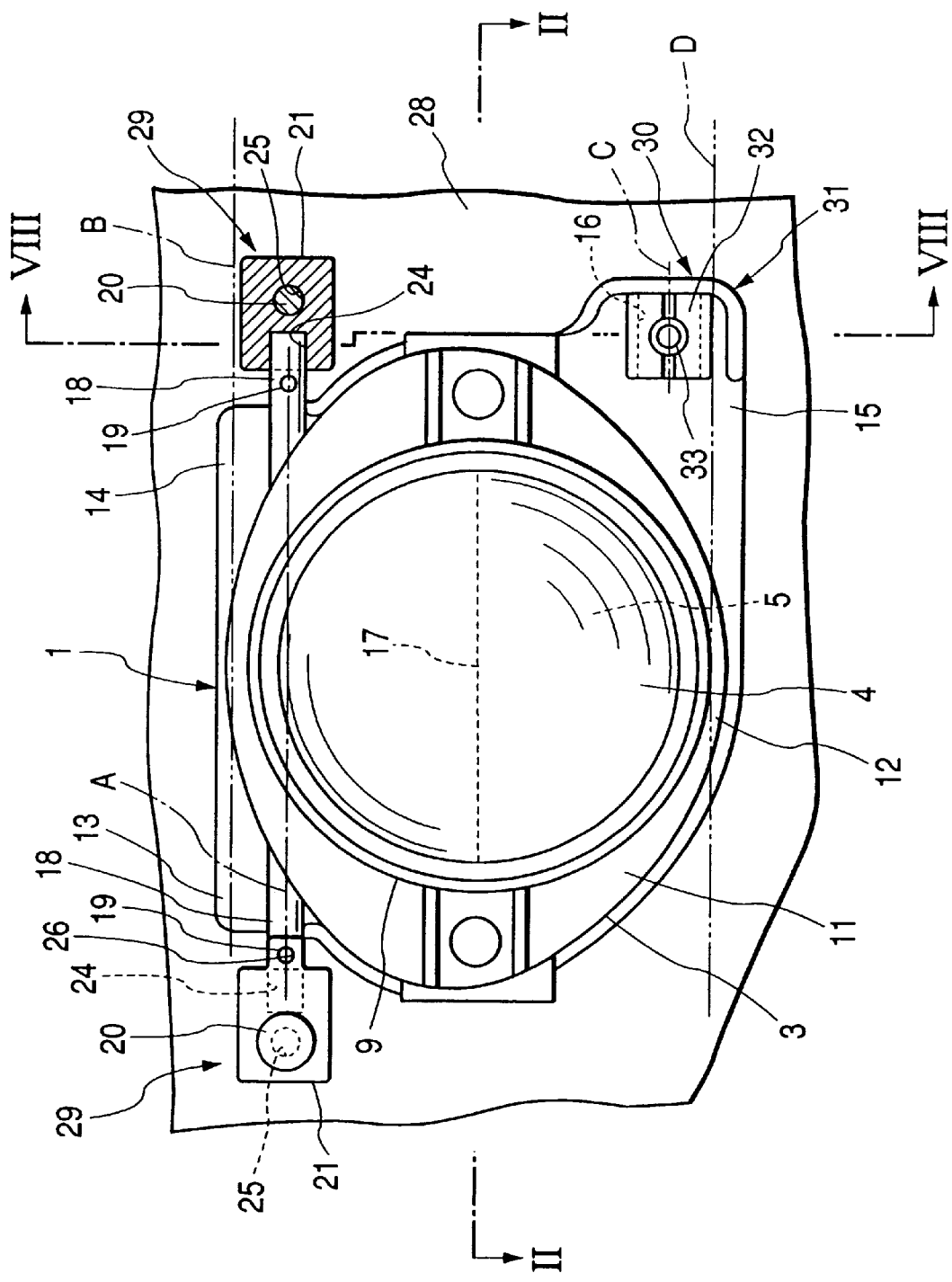
FIG. 1 is a front view showing the arrangement of a vehicle headlight, which is an auxiliary headlight constituting an embodiment of the invention.
Figure 2:
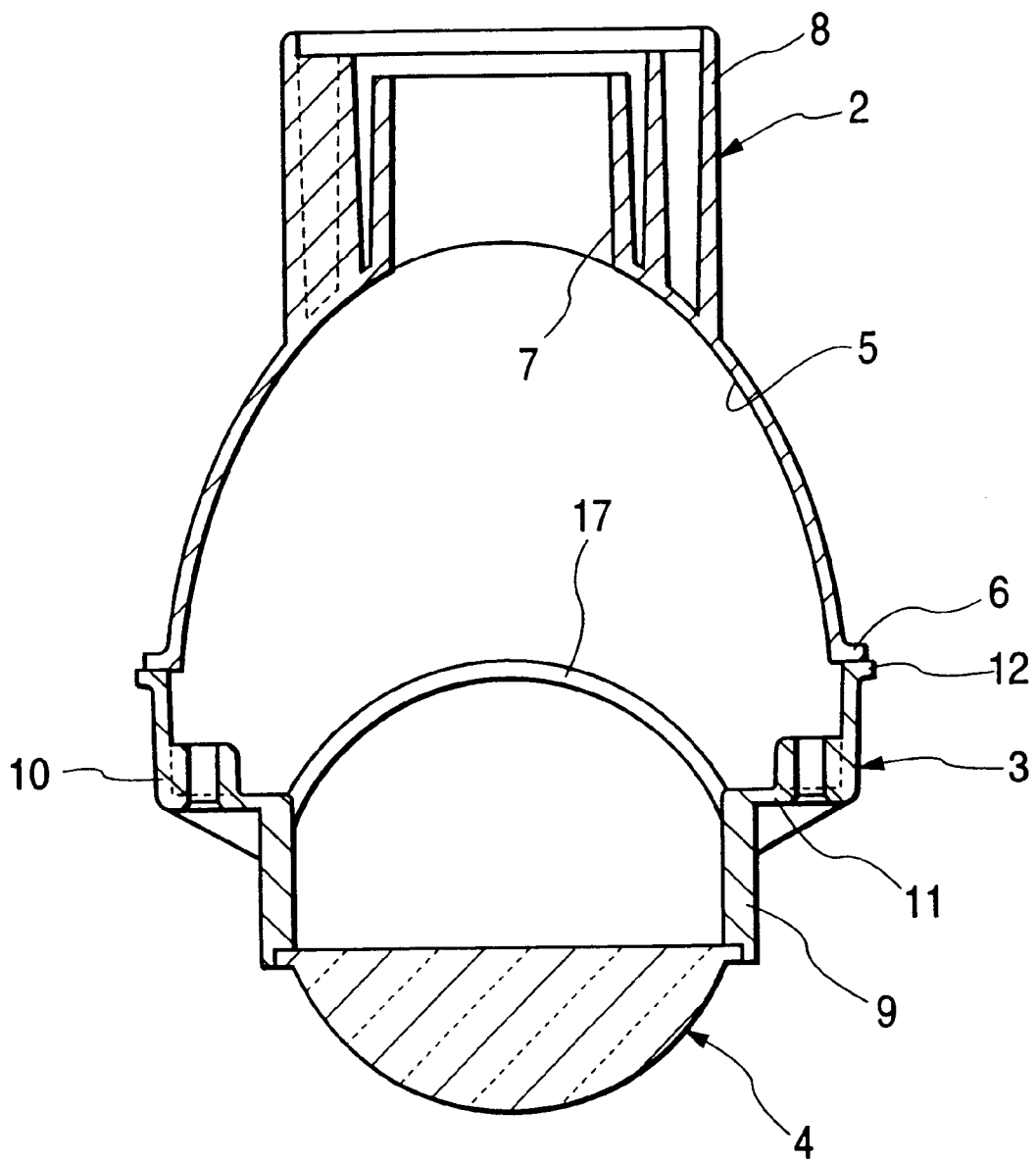
FIG. 2 is a sectional view taken along line II—II in FIG. 1.

As shown in FIGS. 1 and 2, the auxiliary headlight 1 comprises a reflector 2 which is in the form of a container which is opened forwardly, a lens holder 3 coupled to the front open end of the reflector 2, and a lens 4 held by the lens holder 3. A light source bulb (not shown) is arranged in a space which is defined by the reflector 2, the lens holder 3, and the lens 4. The reflector 2 and the lens holder 3 become considerably high in temperature by the heat generated by a light source bulb, and therefore those components are formed with heat-resisting synthetic resin, aluminum die cast or the like.

As shown in FIG. 2, the reflector 2 has a reflecting surface 5 suitable in configuration. More specifically, the surface in a horizontal-vertical direction of the reflector is elliptic-parabolic. The entire periphery of the front opening of the reflector 2 includes a mounting edge 6 which is extended outwardly. More specifically, the upper and lower portions of the mounting edge 6 are extended outwardly more than the remaining portion, thus being substantially in the form of a flange. The opening of the reflector 2 is substantially elliptic, as viewed from the front, being longer horizontally than vertically.

The central part of the reflector 2 has a bulb insertion hole 7 in which the light source bulb is set. The rear opening of the bulb insertion hole 7 is surrounded by a cylindrical wall 8 which is extended backwardly.

As shown in FIGS. 1 through 4, the lens holder 3 includes a cylindrical lens holding section adapted to hold the lens 4;

a substantially elliptic ring-shaped mounting section 10 which agrees in configuration with the opening of the reflector 2; and a deformed-ring-shaped coupling section 11 adapted to couple the lens holding section 9 to the mounting section 10. The coupling section 11 has the inner peripheral edge which is fastened to the lens holding section 9, and the outer peripheral edge which is fastened to the mounting section 10.

Figure 4:
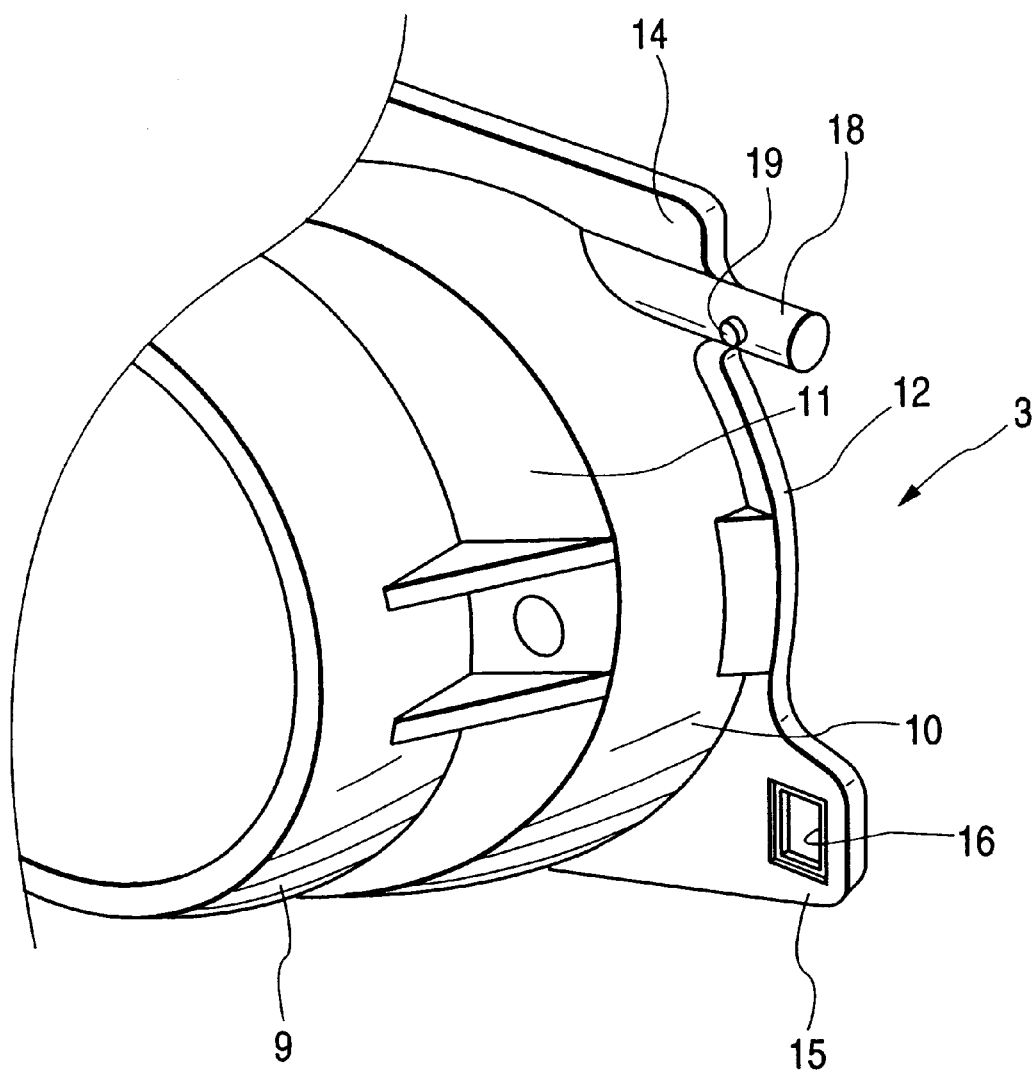
FIG. 4 is a perspective view of a part of the lens holder.

The rear end of the mounting section 10 has a mounting edge 12 which is slightly outwardly protruded substantially as a whole. As shown in FIGS. 2 and 4, the mounting edge 12 has: wide portions 13 and 14 above the lens holder 3 which are extended both horizontally (right and left) and upwardly; and a substantially plate-shaped portion 15 (hereinafter referred to as "a mounting piece", when applicable) below the lens holder which is protruded right (or left) on the right side (or on the left side). The mounting piece 15 has a rectangular supporting hole 16 in which a nut is set which is one of the components forming the irradiation angle adjusting member (described later).

The rear end portion of the inner cylindrical surface of the lens holding section 9; that is, the portion near the coupling section 11, is integral with a shade 17 which is semi-circular as viewed from the front and curved backwardly as viewed from above.

Figure 3:
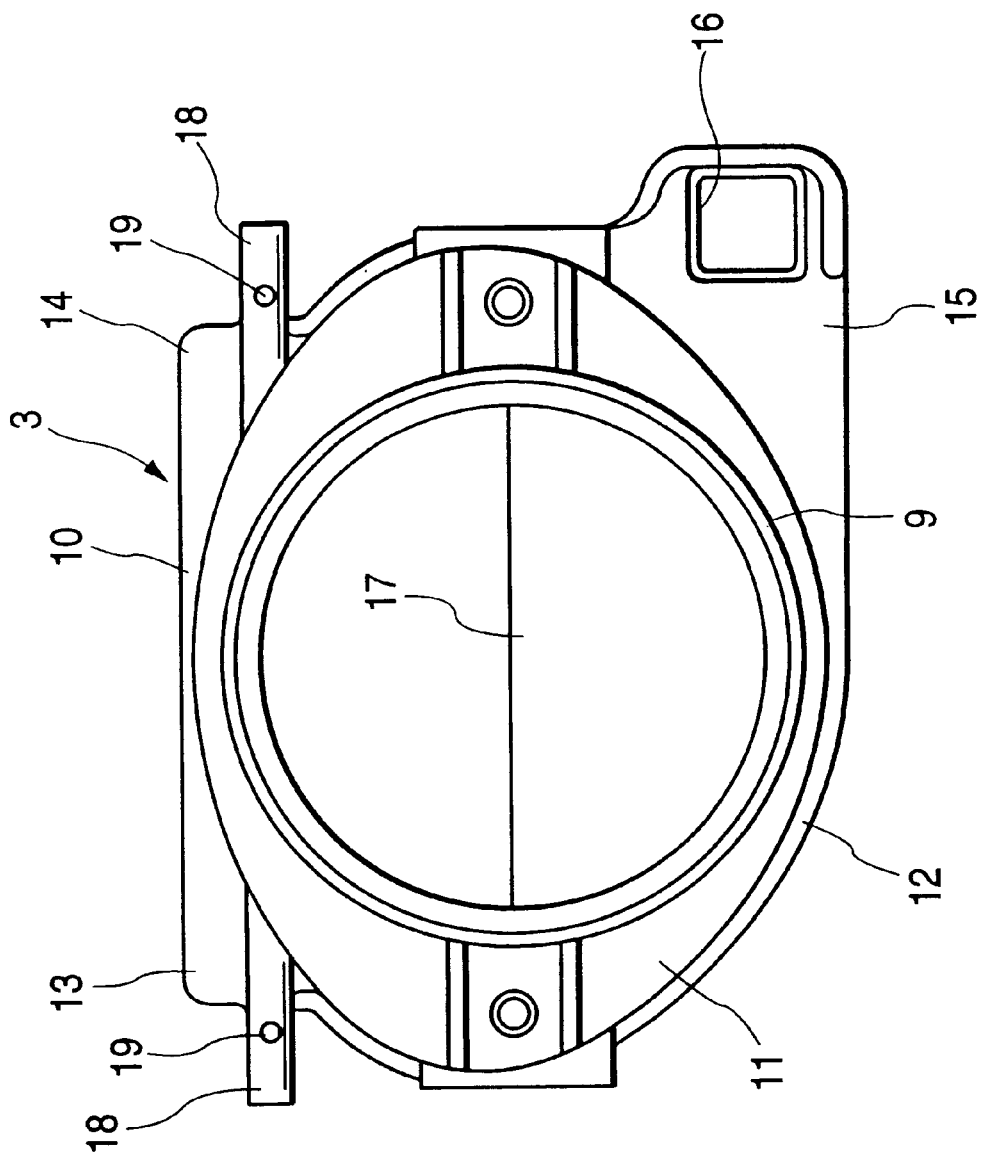
FIG. 3 is a front view of a lens holder.

Above the mounting section 10, supporting shafts 18 and 18 integral with the mounting edge 12 are extended from the rear end of the mounting section 10 in such a manner that the supporting shafts 18 and 18 are horizontal and perpendicular to the axis of irradiation of the auxiliary headlight 1. As shown in FIGS. 3 and 4, from the outer cylindrical surfaces of the supporting shafts 18 and 18, engaging protrusions 19 and 19 are extended forwardly which are to be engaged with the engaging holes of bearing members (hereinafter referred to as "brackets", when applicable) which is adapted to rotatably hold the supporting shafts 18.

The reflector 2 and the lens holder 3, which have been designed as described above, are combined with each other as follows: First, the lens holder 3 is set on the reflector 2 in such a manner that the opening edge of the reflector 2 aligns with the opening edge of the mounting section 10 of the lens holder 3. After the mounting edges 6 and 12 are abutted against each other, the reflector 2 and the lens holder 3 are combined with each other with fasteners such as screws or the like. Under this condition, the lens 4 is fitted in the front opening edge of the lens holding section 9 by a suitable method.

As described above, the supporting shafts 18 and 18 of the lens holder 3 are rotatably held by the brackets 21 and 21.

Figure 5:
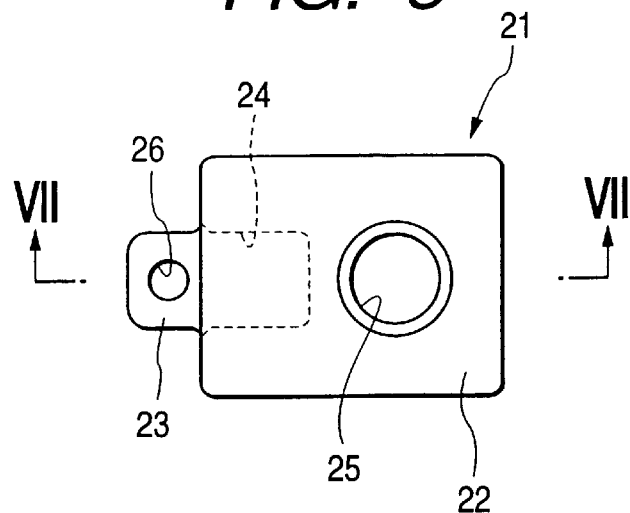
FIG. 5 is a front view of a bracket.
Figure 6:
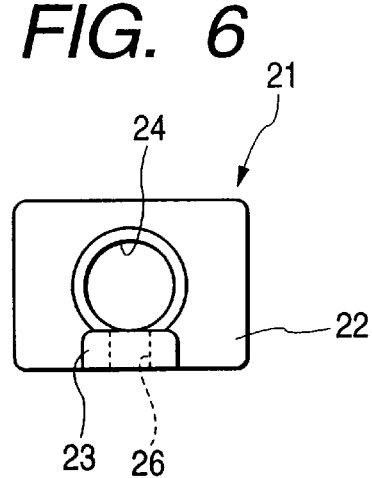
FIG. 6 is a side view of the bracket.
Figure 7:
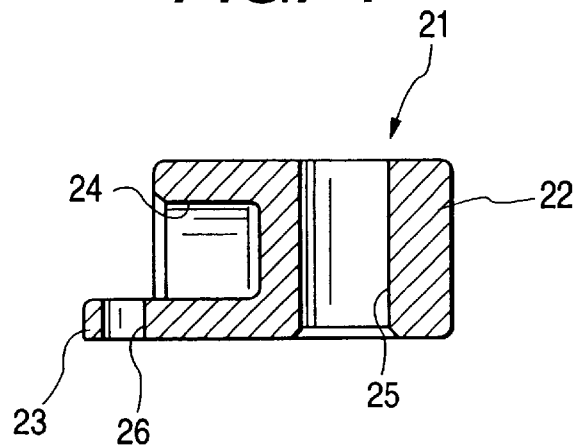
FIG. 7 is a sectional view taken along line VII—VII in FIG. 5.

That is, as shown in FIGS. 5 through 7, each of the brackets 21 comprises a main part 22 which is in the form of a rectangular block, and an engaging tongue 23 which is extended from one side surface of the main part 22.

The main part 22 of the bracket 21 has a holding hole 24 which is opened in the side surface from which the engaging tongue 23 is extended. The supporting shaft 18 is inserted in the holding hole 24, and is rotatably held thereby. In addition, the main part 22 has a mounting hole 25 which penetrates the main part 22 in a direction perpendicular to the direction of axis of the holding hole 24. The screw 20 for fixing the bracket 21 to the supporting member is inserted into the mounting hole 25. Furthermore, the engaging tongue 23 has an engaging hole 26 which is an engaging recess adapted to engage with the engaging protrusion 19 extended from the supporting shaft 18.

Figure 9:
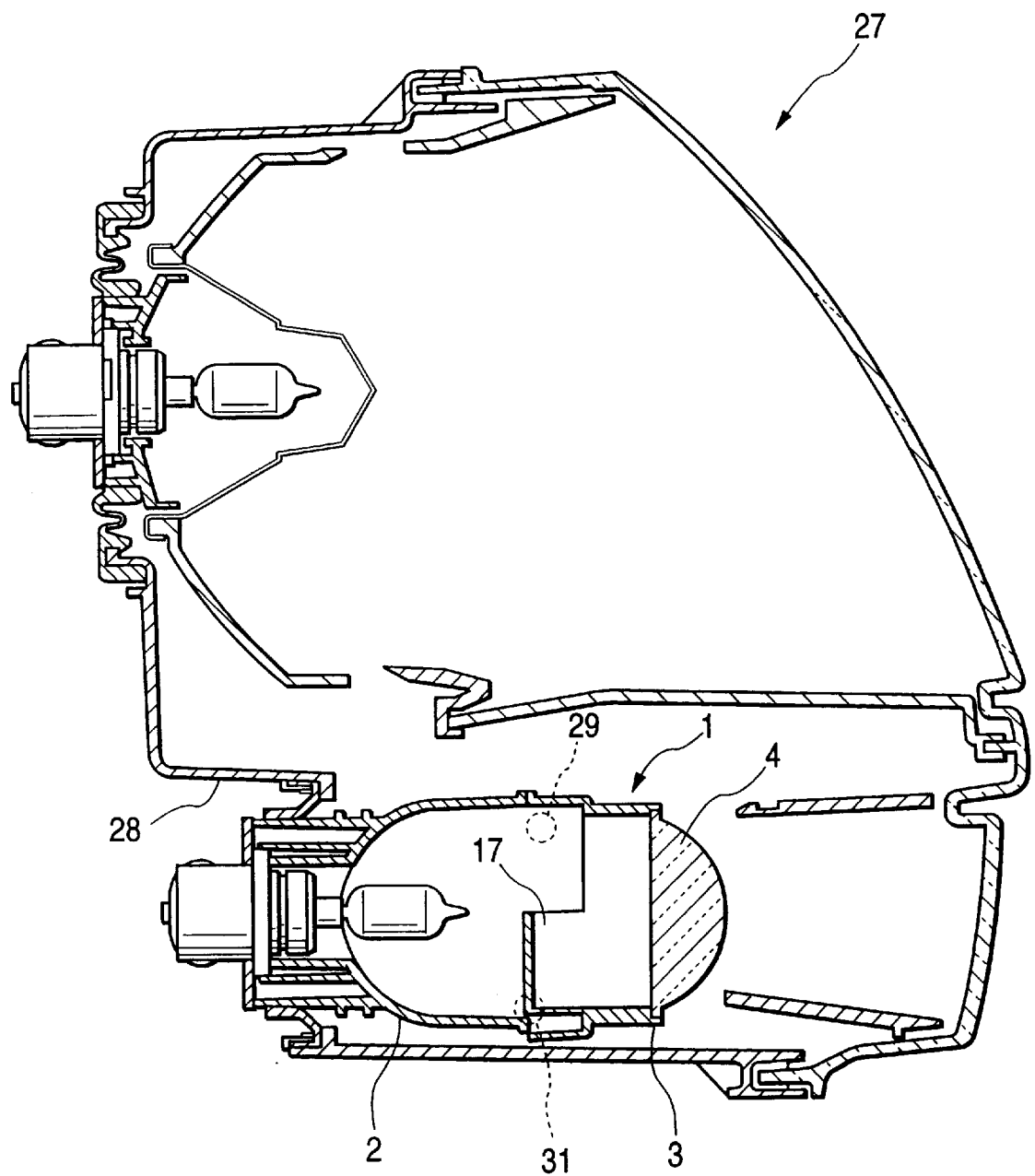
FIG. 9 is a vertical sectional view outlining the auxiliary headlight set in a headlight unit.

The auxiliary headlight 1 in which, as was described above, the reflector 2, the lens holder 3 and the lens 4 are provided as one unit, and the light source bulb is set in the bulb insertion hole 7, is arranged inside the housing 28 of a vehicle headlight unit 27 as shown in FIG. 9.

That is, in advance, the brackets 21 and 21 are mounted on the supporting shafts 18 and 18 of the lens holder 3 (the supporting shafts 18 and 18 being inserted into the holding holes 24 and 24) and the auxiliary headlight 1 is arranged in the housing 28 of the headlight unit 27, and the brackets 21 and 21 are secured to the housing 28 with screws 20 which have been inserted into the holding holes 25 and 25. As a result, the auxiliary headlight 1 is swingably held in the housing 28, and the supporting shafts 18 and 18 and the brackets 21 and 21 form the stationary fulcrum sections 29 and 29.

The brackets 21 are made of synthetic resin which is higher in heat resistance than the material of the housing 28 of the headlight unit 27 which is the supporting member of the auxiliary headlight 1. Hence, transmission of the heat of the reflector 2 and the lens holder 3 to the housing 28 is effectively prevented.

Figure 8:
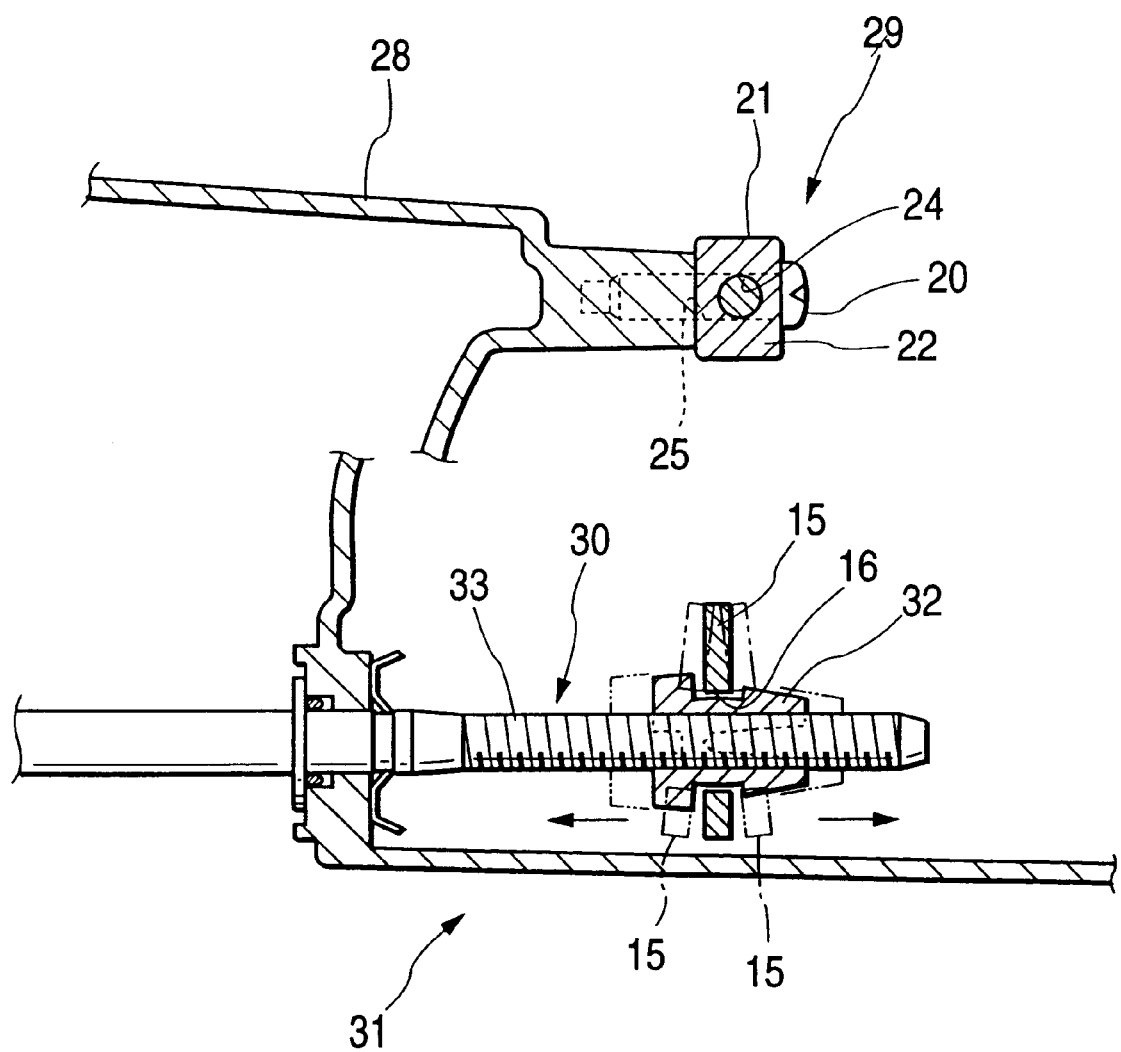
FIG. 8 is a sectional view taken along line VIII—VIII in FIG. 1.

Next, the mounting piece 15 of the lens holder 3 is coupled through a distance adjusting member 30 to the housing 28; that is, the movable fulcrum section 31 is formed. The distance adjusting member 30, as shown in FIG. 8, has a nut 32 set in the supporting hole 16 of the mounting piece 15, and an adjusting screw 33 which is rotatably coupled to the housing 28 and engaged with the nut 32. By operating the adjusting screw 33, the auxiliary headlight 1 is vertically swung about the supporting shafts 18 in the stationary fulcrum sections 29 as indicated by the two-dot chain lines in FIGS. 8 and 9, so that the optical axis is swung vertically.

If, in the case where the auxiliary headlight 1 is secured inside the housing 28, and especially in the case where the distance adjusting member 30 is set in the movable fulcrum section 31, the auxiliary headlight is swung about the stationary fulcrum sections 29 and 29, then it is rather difficult to achieve the assembling work. Therefore, in the auxiliary headlight 1, as was described above, the engaging protrusions 19 and 19 of the supporting shafts 18 and 18, and the engaging holes 26 and 26 of the brackets 21 and 21 are provided.

Accordingly, by engaging the engaging protrusions 19 and 19 with the engaging holes 26 and 26, the supporting shafts 18 and 18 are made unrotatable in the holding holes 24 and 24 of the brackets 21 and 21, and with the engaging protrusions 19 and 19 engaged with the engaging holes 26 and 26 the auxiliary headlight 1 holds its posture stably; that is, the work of setting the distance adjusting member 30 in the movable fulcrum section 31 can be achieved with ease. And at the time of adjustment of the aiming of the auxiliary headlight 1, for instance by adjusting the amounts of protrusion of the engaging protrusions 19 and 19 from the supporting shafts 18 and 18 the engagement of the engaging protrusions 19 and 19 with the engaging holes 26 and 26 can be eliminated whenever required.

As shown in FIG. 1, the line A connecting the stationary fulcrum sections 29 and 29 which is the tilting axis of the auxiliary headlight 1 (the line connecting the central axial lines of the supporting shafts 18 and 18) is located below the horizontal line B which is extended through the upper end of the reflecting surface 5 of the reflector 2; and the horizontal line C which is extended through the center of the movable fulcrum section 31 is located above the horizontal line D which is extended through the lower end of the reflecting surface 5. In other words, the stationary fulcrum sections 29 and 29, and the movable fulcrum section 31 can be arranged closer to the center than the upper end and the lower end of the reflecting surface, respectively. By arranging the stationary fulcrum sections 29 and 29, and the movable fulcrum section 31 in the above-described manner, it is possible to decrease the outward protrusions of the those sections 29 and 31 (especially upward and downward protrusions). This feature makes it possible to reduce the space required for setting the auxiliary headlight 1 in the housing 28 of the headlight unit 27.

While there has been described in connection with the preferred embodiment of the invention, the embodiment is only an example of the vehicle headlight according to the invention, and it will be obvious to those skilled in the art that various changes and modifications may be made therein without departing from the spirit and scope of the invention.

EFFECT(S) OF THE INVENTION

As is apparent from the above description, the vehicle headlight is designed in such a manner that the tilting member is tiltably supported through the irradiation angle adjusting mechanism by a supporting member. In the vehicle headlight, the supporting shaft is provided on the upper part or lower part of the tilting member in such a manner that the supporting shaft protrudes horizontally and in a direction perpendicular to the irradiation axis, with bearing members secured to the supporting member, and the stationary fulcrum sections of the irradiation angle adjusting mechanism are formed by rotatably holding the supporting shaft on the bearing members, and by operating the distance adjusting member arranged in the movable fulcrum section of the irradiation angle adjusting mechanism, the tilting member is tilted with the supporting shaft as a tilting fulcrum.

Accordingly, in the vehicle headlight of the invention, the irradiation angle adjusting mechanism can be made compact with a small number of components. Therefore, the vehicle headlight is low in manufacturing cost, and occupies a small space.

In an implementation of the vehicle auxiliary headlight, the bearing members are made of resin which is higher in heat resistance than the material of the supporting member. This feature prevents the heat generated by the light source bulb from being transmitted to the supporting member.

In another implementation of the vehicle auxiliary headlight, the supporting shaft has the protrusions while the bearing members has the recesses for receiving the protrusions. The opposite configuration, wherein the bearing members have the protrusions and the supporting shaft has the recesses, is also possible. Therefore, when the vehicle headlight is mounted on the supporting member, the position of the vehicle headlight can be temporarily fixed, which improves efficiency during the assembling work.

In yet another implementation of the vehicle auxiliary headlight, the tilting member is the reflecting mirror having a suitably shaped reflecting surface, and the supporting shaft, and the distance adjusting member coupling the tilting member to the supporting member are set closer to the center of the reflecting surface than the upper end and the lower end of the reflecting surface. Therefore, the irradiation angle adjusting mechanism can be made more compact.

The present invention is based on Japanese Patent Application No. Hei. 10-238682, which is incorporated herein by reference.

What is claimed is:

1. A vehicle headlight including a tilting member that is tiltably supported by an irradiation angle adjusting mechanism connected to a supporting member, comprising:

a supporting shaft provided on the upper part or lower part of said tilting member in such a manner that said supporting shaft protrudes horizontally and in a direction perpendicular to an irradiation axis, bearing members secured to said supporting member, wherein stationary fulcrum sections of said irradiation angle adjusting mechanism are formed by rotatably holding said supporting shaft on said bearing members, and a distance adjusting member arranged in a movable fulcrum section of said irradiation angle adjusting mechanism, wherein the distance adjusting member operates to tilt the tilting member with said supporting shaft acting as a tilting fulcrum.

2. The vehicle headlight of claim 1, wherein said bearing members are made of resin which is higher in heat resistance than the material of said supporting member.

3. The vehicle headlight of claim 1, wherein said supporting shaft has protrusions while said bearing members have recesses for receiving said protrusions.

4. The vehicle headlight of claim 1, wherein said tilting member is a reflecting mirror having a suitably shaped reflecting surface, and said supporting shaft, and a distance adjusting member coupling said tilting member to said supporting member are set closer to the center of said reflecting surface than the upper end and the lower end of said reflecting surface.

5. The vehicle headlight of claim 1, wherein the bearing members have protrusions and the supporting shaft has recesses for receiving the protrusions.

6. A compact adjustable headlight unit for connection to a housing of a vehicle headlight, comprising:

a lens holder assembly including a reflecting surface having an upper edge, a lower edge and a center portion;

a lens connected to the lens holder assembly; and a mounting section connected to the lens holder assembly, the mounting section located between the upper edge and the center portion of the reflecting surface and including at least one stationary fulcrum section for connection to the housing, and a movable fulcrum section including a distance adjusting member to enable adjustment of the optical axis of the auxiliary headlight to adjust the irradiation angle.

7. The headlight unit of claim 6, wherein the stationary fulcrum section and the moveable fulcrum section are arranged closer to the center of the reflecting surface than to the upper and lower edges of the reflecting surface.

8. The headlight unit of claim 6, wherein the stationary fulcrum section includes at least one supporting shaft rotatably connected to a bracket.

9. The headlight unit of claim 6, wherein the movable fulcrum section includes a mounting piece and an adjustment screw.

* * * * *